(12) United States Patent
Broadhurst et al.

(10) Patent No.: US 6,205,480 B1
(45) Date of Patent: Mar. 20, 2001

(54) SYSTEM AND METHOD FOR WEB SERVER USER AUTHENTICATION

(75) Inventors: Christopher John Creighton Broadhurst, Reading; Barry Anthony Byrne; Clive John White, both of Wokingham; James Press, Bedfordshire; Piers McMahon, Westles, all of (GB)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/136,682

(22) Filed: Aug. 19, 1998

(51) Int. Cl.[7] ................................................. G06F 15/173
(52) U.S. Cl. .................. 709/225; 709/229; 709/223; 709/224; 709/226; 713/201; 713/202; 707/9; 707/10
(58) Field of Search ................................. 709/223, 224, 709/225, 229, 226; 713/201, 202; 707/10, 9

(56) References Cited

U.S. PATENT DOCUMENTS

| | | | |
|---|---|---|---|
| 5,586,260 | * 2/1993 | Hu ......................................... | 713/201 |
| 5,604,490 | 2/1997 | Blakley, III et al. ........... | 340/825.31 |
| 5,655,077 | 8/1997 | Jones et al. ........................... | 713/201 |
| 5,678,041 | 10/1997 | Baker et al. ............................. | 707/9 |
| 5,682,478 | 10/1997 | Watson et al. ....................... | 709/229 |
| 5,684,950 | 11/1997 | Dare et al. ........................... | 713/201 |
| 5,684,957 | 11/1997 | Kondo et al. ........................ | 713/201 |
| 5,689,638 | 11/1997 | Sadovsky ............................. | 713/202 |
| 5,734,831 | * 4/1996 | Sanders ................................. | 709/223 |
| 5,742,759 | 4/1998 | Nessett et al. ....................... | 713/201 |
| 5,768,504 | 6/1998 | Kells et al. .......................... | 713/201 |
| 5,875,296 | * 1/1997 | Shi et al. .............................. | 713/202 |
| 5,881,225 | * 4/1997 | Worth .................................. | 713/201 |
| 5,918,228 | * 1/1997 | Rich et al. ............................ | 707/10 |
| 5,987,611 | * 4/1996 | Freund ................................. | 713/201 |
| 5,999,978 | * 10/1997 | Angal et al. ........................ | 709/229 |

* cited by examiner

*Primary Examiner*—Glenton B. Burgess
*Assistant Examiner*—Chuong Ho
(74) *Attorney, Agent, or Firm*—Nixon Peabody LLP; Charles M. Leedom, Jr.; Jason H. Vick

(57) ABSTRACT

A method and system for automatically authenticating a user to applications in a network environment. After an initial authentication procedure, the user's identity is mapped into a network credential which includes the user's role, and which is formed into a cookie. To gain access to an application requiring authentication, the cookie is provided to a script, and the information contained in the cookie is used to obtain authentication data required by the desired application.

28 Claims, 2 Drawing Sheets

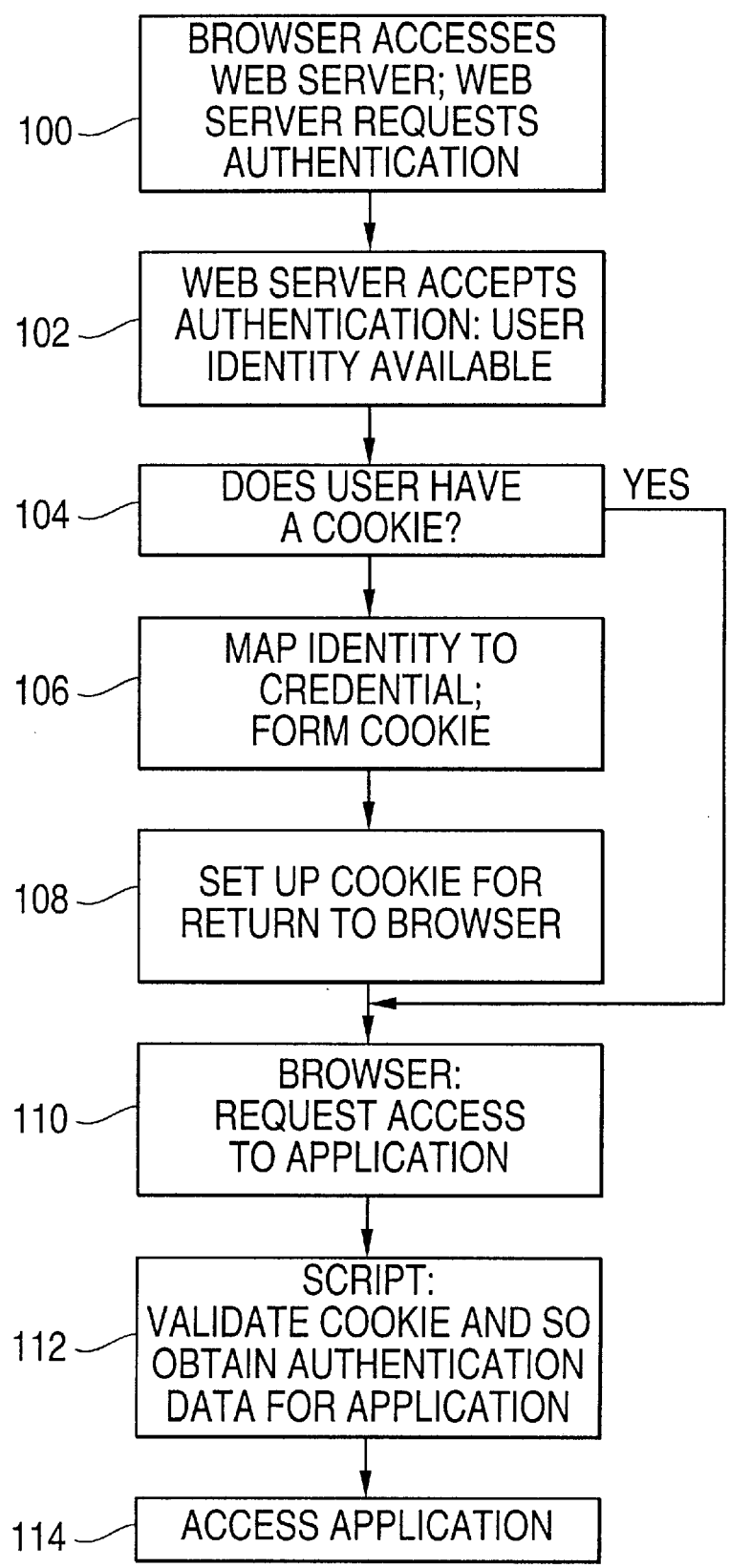

SYSTEM AND METHOD FOR WEB SERVER USER AUTHENTICATION

FIELD OF THE INVENTION

The present invention relates generally to networked computer systems. More particularly, the present invention relates to user authentication and access to back-end or external applications via a web server.

BACKGROUND OF THE INVENTION

In a typical web-based server application, user access to information is achieved via a web server, with the application requiring the user to be authenticated by, e.g., a user id and/or a password. When a user desires access to a new application (such as a database management system (DBMS) engine; new applications will often have a different configuration and/or manufacturer than the initial application), such a new server has a login/authentication procedure which is independent of previous login/authentication procedures encountered by the user. To access the web pages, appropriate identification credentials must be presented to the new application. This is conventionally accomplished by requiring the user to input additional login/authentication information specific to the new application, or by hard-coding a generic login and password in the scripts used by the user's web server to access the new application and dynamically generate a new web page using the output from the application.

Both of these solutions are unsatisfactory. Requiring the user to input additional information places a burden on the user to remember multiple logins and passwords, further places a burden on each server and system administrator to maintain multiple user accounts for each and every access by a user, and is a potential security risk because passwords are transmitted unencrypted over the network. Using a generic or static login and password in a script is a potential security hole and does not readily provide different levels of access based on the identity of the user.

These issues have been addressed by the so-called new technology LAN manager (NTLM) automated authentication system. In the NTLM system, once the user is initially authenticated to a Microsoft network or to a Microsoft Windows NT domain (using a password), similar components (the web browser and server) can assure one another of the user's identity. This assurance occurs transparently to the user. However, this system does not perform authentication to a new application (beyond the server). Thus, the NTLM authentication system is of limited utility for many users.

U.S. Pat. No. 5,689,638 to Sadovsky discloses a method and system for accessing independent network resources without prompting the user for authentication data. When the system receives a user request to access an independent network resource, system logon and server authentication data is autonomously supplied to the independent network resource without further user interaction. Sadovsky, however, is not concerned with a worldwide web hypertext transfer protocol environment, and is not concerned with authentication information based on the user's role. In the Sadovsky system, a password cache is maintained in the main memory of a local computer system. The password cache contains a server name, user name and password for each server to be accessed by a particular user. When presented with an access request, network software searches the password cache structure for the server authentication information before passing it on to the server to be accessed.

U.S. Pat. No. 5,678,041 to Baker et al. discloses a system and method that restricts a user's access of Internet information based on a rating category and/or ID associated with a particular terminal through the implementation of a firewall internal to a user's computer network. The firewall prevents the user from accessing certain types of Internet information (e.g., prevents children from accessing obscene material, prevents workers from accessing non-work related material, etc.). Thus, Baker is concerned with an internal authorization to access remote resources (which are presumed to be public resources), and is not concerned with a system in which authentication information is required by the remote resources.

It would be desirable to allow a user to easily, automatically, and transparently authorized to access, via a web server, a plurality of applications which require authentication, whether in an intranet or internet environment. It would further be desirable for such a scheme to be implemented in a hypertext transfer protocol (HTTP) environment, and to maintain the security of the network. It would further be desirable to allow access regardless of whether the applications are operating in the same or different environments.

SUMMARY OF THE INVENTION

The present invention overcomes the above-described problems, and achieves additional advantages, by providing for a system and method for authenticating a user in a web server environment, by providing for an authentication scheme in which users are logged in and authenticated a single time, yet can access multiple applications via a web server. According to exemplary embodiments, an initial authentication is performed to access a first application via a first server, and the user's identity is mapped into a network credential which includes a user role. Additional applications are accessed by providing the network credential to a script, retrieving script access values for the additional applications based on the network credential and presenting the script access values (as, for example, user name and password) to the additional applications.

The authentication scheme according to the present invention allows a user to access numerous protected resources with a single authentication procedure, greatly improving the user's ease of system use. Further, the use of role-based authentication simplifies system administration burdens. The present invention is particularly advantageous in an intranet environment.

BRIEF DESCRIPTION OF THE DRAWINGS

The present invention will be more completely understood upon reading the following Detailed Description of exemplary embodiments in conjunction with the accompanying drawings, in which like reference indicia designate like elements, and in which:

FIG. 2 is a flow chart describing a method of automatically authenticating a user to back end applications in a network according to the present invention.

DETAILED DESCRIPTION

Figure 1:
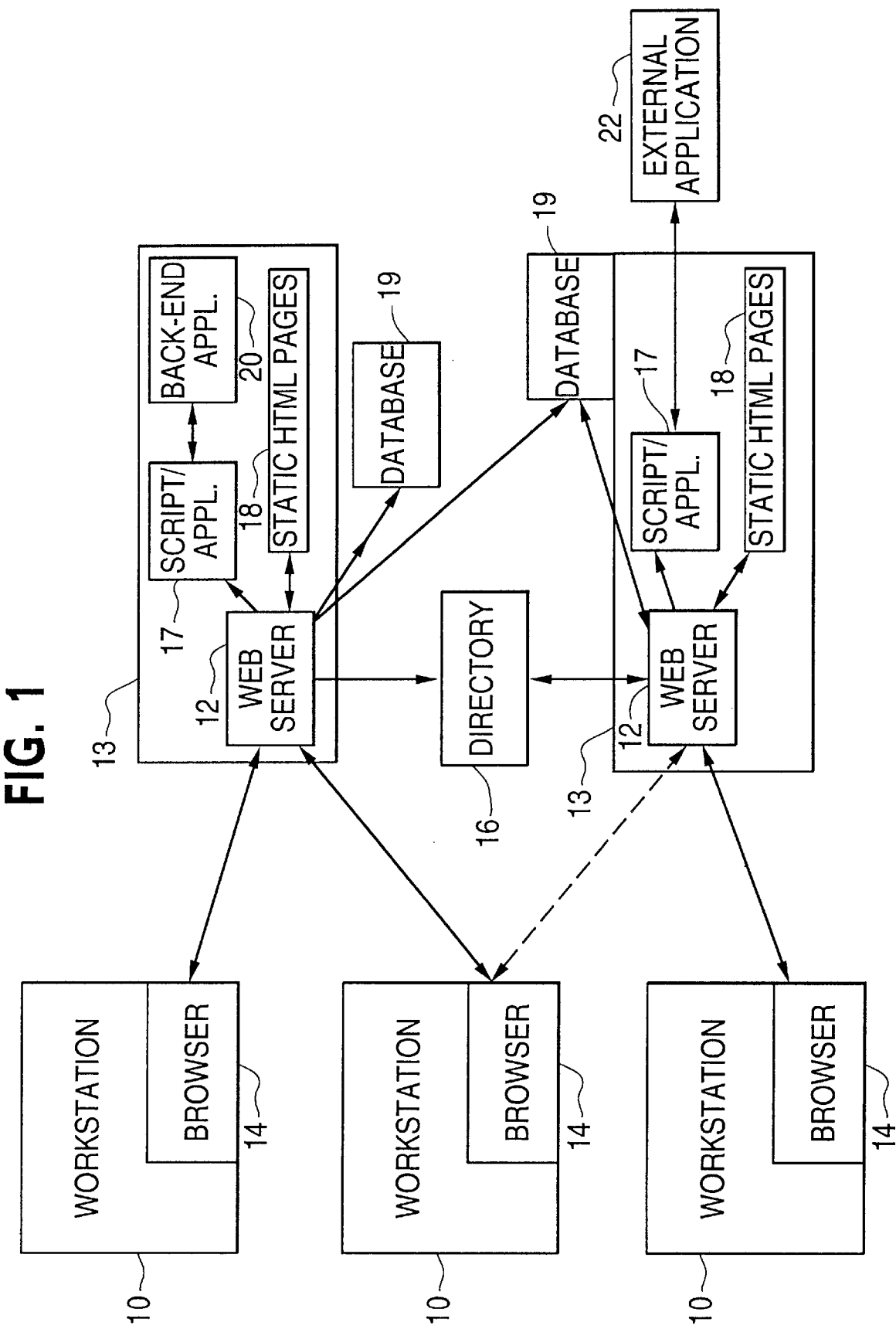
FIG. 1 is a block diagram of an intranet network in which the present invention can be implemented.

Referring now to FIG. 1, a computer network suitable for the method and system of the present invention is shown. The network includes a plurality of computer workstations 10 and a plurality of servers 12 residing on host machine 13.

Each workstation 10 includes a web browser 14 which serves as a user interface to allow the user to access resources in the network. Each server 12 acts as a gateway to provide the user access to various resources, including static HTML (web) pages 18, back-end applications 20 (e.g., a database management system running on the same machine as the web server) and external applications 22 (which run on a different machine than the web server). Access to the back end or external applications is provided through a script or application 17. Each server 12 is configured to allow access by a user to the server resources only upon user authentication to the server. The network also includes an X.500 or other suitable directory 16, which is a network wide data storage resource. More details about X.500 directories are contained in document ITU-T Rec.X.500 (1993) "Information Technology-Open Systems Interconnection—The Directory: Overview of Concepts, Models and Services."

To login to the network, an initial user authentication is performed, such as by a user inputting authentication information into one of the computer workstations 10. According to an aspect of the present invention, the initial authentication information is mapped to a role of the user. Examples of roles can include, but are not limited to, "executive", "clerk", "accounting" etc. Roles can be related to particular departments of an organization, with special designations for department heads. It is assumed that the number of potential user roles will be less than the number of potential users of the network. The user's role determines which applications, and hence which network resources, can be accessed by that user. For purposes of explanation, it is assumed that the network of FIG. 1 is part of an intranet. As will be appreciated by those of ordinary skill in the art, an intranet is a network which uses the same types of software and components as the Internet, but the intranet is reserved for private use only. It is increasingly common for private entities to have web servers which are accessible only to certain persons. While the discussion assumes an intranet environment, it will of course be appreciated that the principles of the present invention can be readily adapted for use in other network environments.

For each user, the directory 16 stores information which allows the user's authentication information to be mapped into a network credential which includes a role of the user. The network credential can then be formed into a cookie. Once logged in and initially authenticated to the network, a user may freely access any of the applications allowed by the role.

To access additional resources not included in the initial list, the user inputs a request to access additional resources, which may be associated with the user's initial server or a new server in the network. Access to the back end or external application is achieved using a script (a series of commands which can be executed without user interaction) or other similar means accessible as a web server resource. The script is written by the system administrator, stored on the same host machine as the web server, and provides the login code for the server/application. The user name and password are not hardcoded into the script, but rather are stored in script access procedure variables (SV) having names chosen by the system administrator. The password values are preferably encrypted to enhance security. The SV's are stored in a database which can be the directory 16 or another suitable database (such as database 19 associated with the server host 13) accessible to the server. According to an aspect of the present invention, in response to a user request through the browser, the script retrieves the SV value from the directory 16 based on an SV name contained in the script, the user's role and identity (contained in a cookie provided to the script). In this manner, the identity and password used by the user to access the third party application are determined by the user's role and individual identity.

Referring now to FIG. 2, a flow chart describing an exemplary method according to the present invention is shown. The method begins in step 100, where a user logs on to the network (e.g., the network shown in FIG. 1) using any conventional login procedure, and the browser accesses a web server. In step 102, an initial authentication procedure is performed, and is accepted by the server to establish a user identity to the server. The initial authentication can be achieved using basic authentication (which requires user interaction), NTLM (which requires no user interaction), X.509 certificate (which may or may not require user interaction), or other suitable means. More details about X.509 certificates are provided in document ITU-T Rec.X.509 (1993), entitled "Information Technology—Open Systems Interconnection: The Directory: Authentication Framework." In step 104, it is determined whether the user already has a cookie containing a network credential. If there is not yet a user cookie, one is created in step 106 by consulting the directory 16 to map the user's identity to an intermediate identity and a user role, which are used to form a network credential. If no mapping can be found between the user's local identity and a network credential, a "no-map" cookie is created to prevent repeated failed lookups. The user's network credential, including user role, is formed into a cookie by appending the identity of the user's terminal to the credential, and making a cryptographic seal of the result. The cookie is then preferably encoded. As will be appreciated by those of ordinary skill in the art, a cookie is a message given to a web browser by a web server to record aspects of the interaction history between the browser and server, and which is stored by the web browser to facilitate access to additional server resources. The cookie is preferably configured to disappear when the browser program is closed by the user. In step 108, the cookie is returned to the browser.

Note that if there is already a cookie for the user, the process skips steps 106 and 108, and proceeds to step 110.

In step 110, the user attempts access to a new application (a back-end application resident on the same host machine as the web server or an external application not resident on the same host machine as the web server) by inputting a request to the browser, which then attempts to access the requested resources. These additional resources may or may not be accessible to the user based on the user's assigned role. In step 112, the browser obtains authentication information, in the form of SV values necessary to access the back-end or external application, by accessing a script for single sign on stored with the web server, and transferring the cookie to the script. The script retrieves the script access variable for the back-end or external application based on the network credential (including the user role), and presents the SV values to the new application. Step 112 is performed automatically by the browser without any action required on the part of the user beyond presenting the request in step 108. In step 114, the desired application grants access based on the authentication information obtained in step 112.

While the foregoing description includes many details and specificities, these are included only for purposes of illustration, and are not intended to limit the invention. Many modifications to the examples described above will be readily apparent to those of ordinary skill in the art which do not depart from the scope of the invention, as defined by the following claims and their legal equivalents.

What is claimed is:

1. A method for accessing protected applications on a network, comprising:

performing an initial authentication of a user via a web server;

creating a network credential for the user, the network credential including at least a role of the user;

receiving a user request to access a protected application via the web server;

automatically accessing a script configured to determine at least one script access value based on the network credential and a script access value name, the at least one script access value providing user access authentication information for the protected application; and presenting the user access authentication to the protected application.

2. The method of claim 1, wherein the step of creating a network credential comprises selecting a user role from a plurality of roles, and wherein the number of roles is less than a number of network users.

3. The method of claim 1, further comprising the step of forming a cookie from the network credential.

4. The method of claim 3, wherein the step of transferring the network credential is performed by transferring the cookie.

5. The method of claim 1, wherein the step of creating is performed by mapping user initial authentication data to the network credential by consulting an X.500 directory.

6. The method of claim 1, wherein the network is an intranet.

7. The method of claim 1, wherein the step of performing the initial authentication comprises mapping the user to a user role.

8. A system for providing user access to protected applications, comprising:

a plurality of servers for managing network resources including one or more protected applications, each configured to grant access to a protected application upon user authentication;

a browser communicating between the user and the plurality of servers, the browser being capable of accessing initial user authentication information; and computer memory for storing data defining mapping between initial user authentication information, network credentials including a user role, and script access values;

wherein the browser provides user access to the one or more protected applications via a web server based on the initial authentication information, and by consulting the stored script access values transparently to the user via a script.

9. The system of claim 8, wherein the servers are intranet network servers.

10. The system of claim 8, wherein the number of user roles is less than a number of system users.

11. The system of claim 8, wherein the browser communicates with the servers according to a hypertext transfer protocol format.

12. The system of claim 8, wherein the first server creates a cookie including the user role, and the browser provides access to a second application by providing the cookie to a script which is stored on the network.

13. The system of claim 12, wherein the first server accesses script access values stored in a database for the second application based on the cookie.

14. The system of claim 8, wherein said computer memory comprises a first directory for storing data defining mapping between said initial user authentication information and network credentials, and a second directory for storing the script access values.

15. The system of claim 8, wherein said computer memory comprises a single directory for storing said data defining mapping between said initial user authentication information and said script access values.

16. A computer readable storage medium including machine-readable instructions comprising:

one or more instructions for performing an initial authentication of a user via a web server;

one or more instructions for determining a network credential for the user, the network credential including at least a role of the user;

one or more instructions for receiving a user request to access a protected application via the web server;

one or more instructions for automatically accessing a script configured to retrieve at least one script access value based on the network credential and a script access value name, the at least one script access value providing user access authentication information for the protected application; and one or more instructions for presenting the user access authentication to the protected application.

17. The medium of claim 16, wherein the step of creating a network credential comprises selecting a user role from a plurality of roles, and wherein the number of roles is less than a number of network users.

18. The medium of claim 16, further comprising one or more instructions for forming a cookie that includes the network credential.

19. The medium of claim 16, further comprising one or more instructions for mapping the user to a user role.

20. The medium of claim 16, further comprising one or more instructions for selecting a user role from a plurality of roles wherein the number of roles is less than the number of network users.

21. A computer readable medium including machine-readable instructions comprising:

one or more instructions for performing an initial authentication of a user via a web server;

one or more instructions for determining a network credential for the user, the network credential including at least a role of the user;

one or more instructions for receiving a user request to access at least one protected application via the web server;

one or more instructions for automatically accessing a script;

one or more instructions for transferring the network credential to the script;

one or more instructions for determining a script access value name based upon said user role;

one or more instructions for retrieving script access values based on said script access value name;

one or more instructions for determining a user identification and password based on the script access values; and one or more instructions for presenting the determined user identification and password for user access to one or more of the at least one protected application.

22. The medium of claim 21, further comprising one or more instructions for mapping the user to a user role.

23. The medium of claim 21, further comprising one or more instructions for selecting a user role from a plurality of roles wherein the number of roles is less than the number of network users.

24. The medium of claim 21, further comprising one or more instructions for forming a cookie that includes the network credential.

25. The medium of claim 21, further comprising one or more instructions for consulting an X.500 directory.

26. Computer readable data transmission between a web server and a browser for authenticating user access to at least one protected application on a network comprising:

at least one data structure for performing an initial authentication of a user;

at least one data structure for determining a network credential for the user, the network credential including at least a role of the user;

at least one data structure transferring a user request to access a protected application on the network;

at least one data structure for automatically accessing a script configured to retrieve at least one script access value based on the network credential and a script access value name, the at least one script access value providing user access authentication information for the protected application; and at least one data structure for presenting the user access authentication information to the protected application.

27. Computer readable data transmission between a web server and a browser for authenticating user access to at least one protected application on a network comprising:

at least one data structure that automatically accesses a script configured to determine at least one script access value based on a network credential and a script access value name, the at least one script access value providing user access authentication information for a protected application, and the network credential including at least a role of the user; and at least one data structure that presents the user access authentication information to the protected application.

28. A method for accessing information on a network, comprising:

performing an initial authentication of a user via a web server;

creating a network credential for the user, the network credential including at least a role of the user;

receiving a user request to access at least one of an application, a file or a document via the web server;

automatically accessing a script configured to determine at least one script access value based on the network credential and a script access value name, the at least one script access value providing user access authentication information for at least one of the at least one application, file or document; and presenting the user access authentication to the at least one application, file or document.

* * * * *